(12) United States Patent
Welch et al.

(10) Patent No.: US 7,116,380 B2
(45) Date of Patent: Oct. 3, 2006

(54) VIDEO PROJECTOR AND OPTICAL LIGHT VALVE THEREFOR

(75) Inventors: Brian Welch, Baie d'Urfée (CA); Michael Miller, Ottawa (CA)

(73) Assignee: CAE Inc., St. Laurent (CA)

( * ) Notice: Subject to any disclaimer, the term of this patent is extended or adjusted under 35 U.S.C. 154(b) by 503 days.

(21) Appl. No.: 10/222,794

(22) Filed: Aug. 19, 2002

(65) Prior Publication Data

US 2003/0048390 A1    Mar. 13, 2003

(51) Int. Cl.
*H04N 5/74* (2006.01)
*G02B 26/00* (2006.01)

(52) U.S. Cl. ............... 348/771; 359/291; 359/295

(58) Field of Classification Search ............ 348/771; 359/290–295; 353/30, 31; 345/55, 108; 349/5
See application file for complete search history.

(56) References Cited

U.S. PATENT DOCUMENTS

| | | | |
|---|---|---|---|
| 3,912,386 A | 10/1975 | Gorog et al. | |
| 4,793,699 A | 12/1988 | Tokuhara | |
| 5,035,475 A | 7/1991 | Lee et al. | |
| 5,245,369 A | 9/1993 | Um et al. | |
| 5,457,566 A | 10/1995 | Sampsell et al. | |
| 5,488,505 A | 1/1996 | Engle | |
| 5,526,172 A * | 6/1996 | Kanack | 359/291 |
| 5,560,697 A * | 10/1996 | Lim et al. | 353/37 |
| 5,637,517 A | 6/1997 | Choi | |
| 5,903,323 A * | 5/1999 | Ernstoff et al. | 348/771 |
| 5,915,168 A | 6/1999 | Salatino et al. | |
| 5,917,647 A | 6/1999 | Yoon | |
| 5,959,763 A | 9/1999 | Bozler et al. | |
| 6,013,573 A | 1/2000 | Yagi | |
| 6,101,036 A * | 8/2000 | Bloom | 359/567 |
| 6,108,117 A * | 8/2000 | Furlani et al. | 359/224 |
| 6,147,789 A | 11/2000 | Gelbart | |
| 6,175,443 B1 * | 1/2001 | Aksyuk et al. | 359/291 |
| 6,201,629 B1 * | 3/2001 | McClelland et al. | 359/223 |
| 6,360,036 B1 * | 3/2002 | Couillard | 385/19 |
| 6,674,562 B1 * | 1/2004 | Miles | 359/291 |
| 6,677,695 B1 * | 1/2004 | Dhuler et al. | 310/309 |
| 6,720,851 B1 * | 4/2004 | Hallbjorner et al. | 335/78 |
| 2002/0109904 A1 * | 8/2002 | MacDonald et al. | 359/291 |

* cited by examiner

*Primary Examiner*—Victor R. Kostak
(74) *Attorney, Agent, or Firm*—Ogilvy Renault LLP

(57) ABSTRACT

A video projector apparatus including a linear array of individually addressable reflective active elements, an optical system including a light source and providing a linear light pattern focused on said linear array and from which is created an image of the linear array, an optical scanning system for receiving the image of the linear array including a scanning member that successively scans the array to provide a two-dimensional image, and a projection system receiving the two-dimensional image and including a screen upon which the two-dimensional image is displayed.

18 Claims, 8 Drawing Sheets

FIG_4

VIDEO PROJECTOR AND OPTICAL LIGHT VALVE THEREFOR

FIELD OF THE INVENTION

The present invention relates in general to an improved video projector. More particularly, the invention also relates to an improved micro electro mechanical (MEM) light valve of the reflective type. Also described in accordance with the present invention are improved methods relating to the forming of the video image as well as the method of fabrication of the MEM device.

BACKGROUND OF THE INVENTION

Current video projectors can be categorized into three quite distinct technologies. The first uses a two-dimensional scanning system to direct a beam of electrons or photons onto a phosphorescent layer of material which emits visible light as a function of the intensity of the incident beam. The light can be collected by a lens system and focused on a screen to form an image. The most common example of this category is the CRT projector. These projectors are limited in their resolution capabilities by the need to focus the incident beams onto a sufficiently small spot, the thickness of the light emitting material and the bandwidth of the modulation drive electronics.

The second category eliminates the scanning beam by using a directly addressable two-dimensional array to activate the phosphorescent material. Examples of such devices are organic light emitting diode displays (OLED'S). These displays are limited in their resolution capabilities by the difficulties in manufacturing two-dimensional arrays with very large numbers of individually addressable elements.

The third category is known as light valves. These do not emit light directly from a scanned phosphorescent material but, as their name implies, use a two-dimensional scanned array to modulate a light beam from a light source such as an arc lamp. Early light valves such as the Eidophor or the Talaria used scanned beams of electrons to modulate the transmission or reflection of the light valve materials. Current systems use digitally addressable two-dimensional arrays to modulate the optical characteristics of each addressable element of the light valve which is usually a thin layer of liquid crystal material. The resolution of these devices is also limited by the difficulty in making two-dimensional arrays with very large numbers of individually addressable elements.

Also, micro electro mechanical (MEM) devices are finding uses in the display industry. Digital light processing (DLP) technology, such as manufactured by Texas Instrument, is used by many display manufacturers using MEM technology to create a two-dimensional array of tiny mirrors to form a digitally addressed light valve system. Similar products are also manufactured by other companies.

The grating light valve (GLV), such as described in U.S. Pat. No. 5,331,360, uses a similar concept but it uses a diffractive grating rather than a reflecting mirror surface to perform the modulation functions. This grating uses strips of material which are only 3 microns in width. Manufacturing tolerances can create significant differences in the optical characteristics of adjacent pixels.

SUMMARY OF THE INVENTION

Accordingly, it is an object of the present invention to provide a linear, reflective, array which is used with an illumination system and an optical scanning projection system to form a video projector having substantially higher resolution than other projectors presently on the market. This projector is particularly useful in flight simulator visual systems.

Another object of the present invention is to provide an improved reflective type MEM light valve. This light valve is preferably embodied in a linear array of individually addressable elements, scanned optically in the orthogonal direction to the array, to form a two-dimensional image.

To accomplish the foregoing and other objects features and advantages of the invention, in accordance with the invention there is provided a video projector apparatus that comprises a linear array of digitally and individually addressable reflective active elements, an optical system including a light source and providing a linear light pattern focused on said linear array and from which is created an image of the linear array, an optical scanning system for receiving the image of the linear array including a scanning member that successively scans said array to provide a two-dimensional image, and a projection system receiving said two-dimensional image and including a screen upon which the two-dimensional image is displayed.

More particularly, the two-dimensional image may have its width proportional to the length of the linear array and its height proportional to a scanning range of the scanning member. The optical system may further comprise a mirror for directing the linear light pattern on to the linear array. Each active element has an "on" state and an "off" state. For the "off" state of the active element substantially all light reflected from the active element is directed toward said optical system and reflected from the mirror. For the "on" state of the active element part of the light reflected from the active element bypasses the mirror to define a pixel of the image, having a given brightness.

In accordance with another aspect of the present invention there is provided a micro electro mechanical device that comprises a bridge element having a structural member upon which is formed a reflective layer, and a pair of electrodes for activating the bridge element. The bridge element further comprises wall means for supporting said structural member and, in turn, said reflective layer spacedly over one of said electrodes. The bridge element has at least two different reflective states including a first state in which the electrodes are unenergized and the reflective layer is in a first position, and a second state in which the electrodes are energized and the reflective layer is in a deflected position so as to alter the light angle reflected from the reflective layer.

More particularly, the structural member may be substantially planar and is maintained in a substantially planar position when said bridge element is in its first unenergized state. The structural member in the deflected position is curved preferably concavely for spreading reflected light. The structural member has the reflective layer on the top surface thereof, and another electrode of the pair of electrodes is supported at a bottom surface of the structural member. A void is defined between the one and another electrode so as to enable deflection of the structural member. The wall means may comprise a pair of walls extending from a base and respectively supporting ends of the structural member. The walls support the structural member so that, in the deflected position, thereof, the ends of the structural member are maintained substantially fixed while the center of the structural member deflects.

In accordance with another aspect of the present invention there is provided an optical apparatus that comprises at least one addressable reflective active element having two reflectivity states including an unenergized state and an energized state in which the light pattern reflected therefrom is wider than in the unenergized state, and an optical system coupled from the light source and including a series of optical members for establishing a light beam that is directed to the active element. The series of optical members include a mirror member for establishing said light beam, and a collection member. The mirror member is positioned so that in the unenergized state light is impeded from reaching the collection member, and in the energized state light passes about the mirror member to the collection member, the amount of light which passes said mirror being proportional to the deflection of the active element.

The apparatus may comprise a plurality of active elements wherein each active element is disposed in a linear array. The optical system provides a linear light pattern focused on the linear array. The mirror member is disposed so as to reflect light from the light source to the linear array. When an active member is in the unenergized state, substantially all light reflected from the active member is redirected by the mirror member back toward the light source. When an active member is in the energized state, a part of the light reflected from the active member passes about the mirror member to the collection member. The series of optical members also comprises at least one collimating lens disposed between the light source and mirror member. The series of optical members also comprises a second collimating lens disposed between the mirror member and active element. The collimating member may comprise a third refocusing lens on an opposite side of the mirror member to said active element and for refocusing light reflected from said active member, in the energized state thereof, to an image area. The active element may be a micro electro mechanical device.

In accordance with a further aspect of the present invention there is provided a method of forming a video image on a screen or the like. This method comprises providing a plurality of digitally and individually addressable reflective active elements each having two reflectivity states including an unenergized state representative of a flat mirror and an energized state representative of a curved mirror, establishing a light beam focused on said active elements, providing a collection system for reflected light from said active elements, maintaining an active element in its unenergized state whereby reflected light from said active element is directed away from said collection system, and maintaining another active element in its energized state whereby reflected light from said active element is directed to said collection system. More particularly, the plurality of active elements may be in a linear array. The step of establishing may include establishing a line of light focused on the linear array of active elements for creating a linear image of the linear array. This may also include successively scanning the linear image of the linear array to provide a two-dimensional image. Further is the step of projecting the two-dimensional image on a screen.

In accordance with still a further aspect of the present invention there is provided a method of fabricating a micro electro mechanical device. This includes providing a base substrate, forming a pair of space electrodes from the substrate, forming over the substrate and extending therefrom a structural dielectric layer to form a microbridge that is freely supported for deflection over the substrate, and depositing a reflective metal layer on the structural dielectric layer.

BRIEF DESCRIPTION OF THE DRAWINGS

Numerous other objects, features and advantages of the present invention should now become apparent upon a reading of the following detailed description as taken in conjunction with the accompanying drawings, in which:

FIG. 3 is a schematic diagram of the optical scanning and projection system in accordance with the present invention;

DETAILED DESCRIPTION OF PREFERRED EMBODIMENTS

There is described herein a reflective type MEM device arranged with a plurality of active elements disposed in a linear reflective array which is used in conjunction with a laser illumination system, a Schlieren optical system, and an optical scanning projection system to form a video projector having high resolution. The linear array of individually addressable elements is scanned optically in the orthogonal direction to the array to form a two-dimensional image. The manufacture of a linear array with several thousand individually addressable elements is far easier than constructing a two-dimensional array with a similar number of elements in each direction. A further advantage of the reflective MEM light valve of the present invention is the fast switching time of each element in the linear array which eliminates the smearing effect seen in prior art light valves. This makes the device and system of the present invention very suitable for rapidly moving images as required in flight simulation and certain types of movie films.

The reflecting mirrors used in the present invention are preferably about 25 microns across thus are much more robust than, for example the mirrors described in the aforementioned U.S. Pat. No. 5,331,360. Also, the reflecting mirrors in accordance with the present invention can be made with much greater uniformity thereby providing a higher image quality.

Figure 1A:
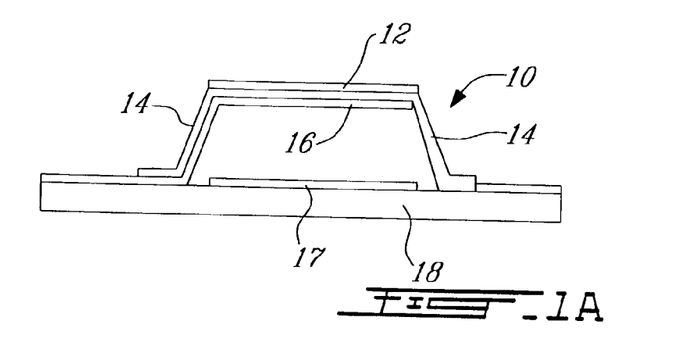
FIG. 1A is a side view of the MEM device in its "off" state.
Figure 1B:
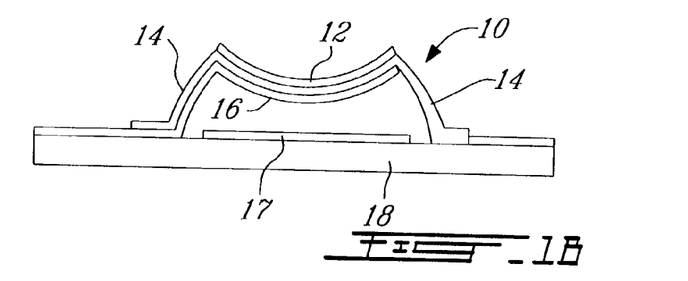
FIG. 1B is a side view of the MEM device in its "on" state.
Figure 1C:
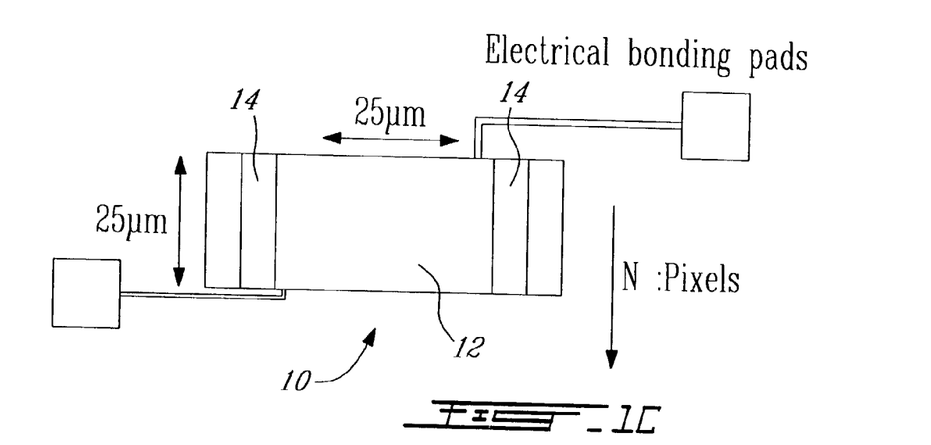
FIG. 1C is a plan view of the MEM device.

Reference is now made to FIGS. 1A–1C for a schematic illustration of the MEM device 10 in accordance with the present invention. For further details of the fabrication of this device refer to FIGS. 5A–5H, to be described in further detail hereinafter.

FIG. 1A illustrates the device 10 in its "off" state. FIG. 1B illustrates the device 10 in its "on" state. FIG. 1C illustrates a plan view of the device 10. Each active element is a small microbridge mirror with dimensions on the order of 25 microns wide, 25 microns in length, (i.e. orthogonal to the length of the array), and 0.15 microns thick. Note that in FIG. 4, each active element is of elongated construction. Thus, it is possible to have various configurations of the active element.

Figure 4:
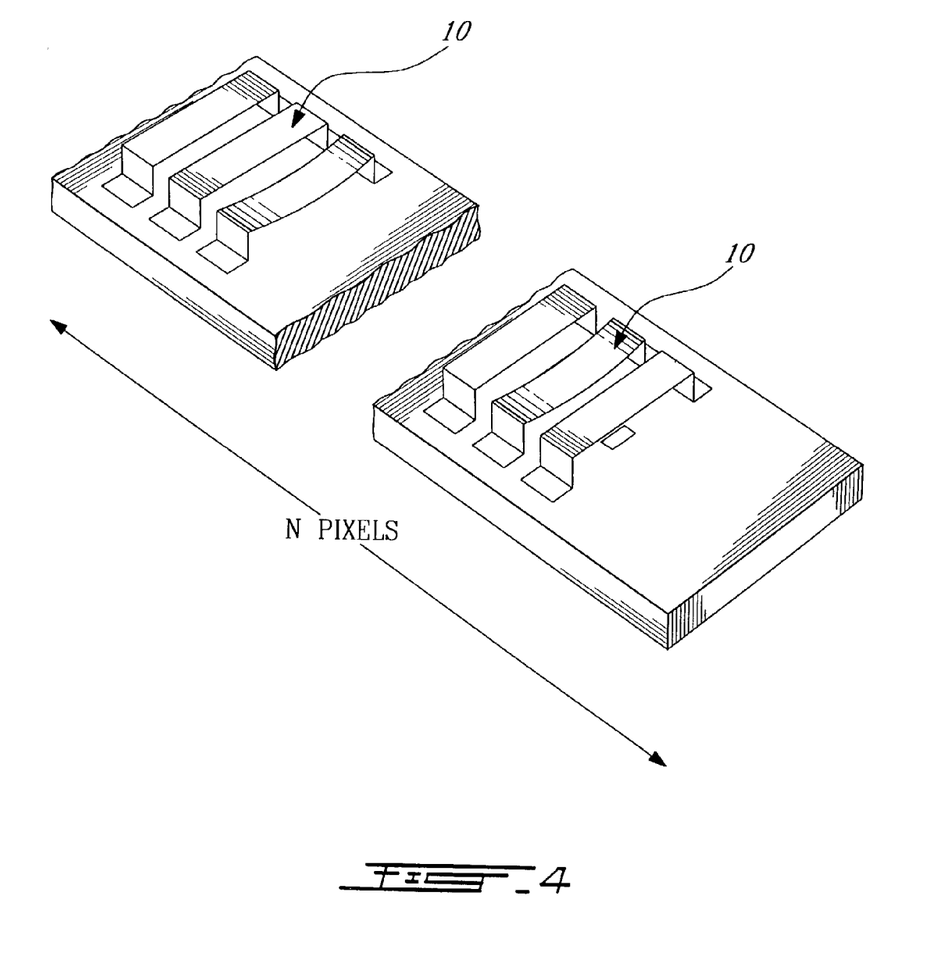
FIG. 4 schematically illustrates the linear array of active elements.

The mirror 12 is supported on two opposite sides by short walls 14 which keep the mirror about 2 microns above the surface of the electrode on the substrate as shows. FIGS. 1A–1C illustrate the electrodes 16 and 17 as well as the substrate 18. When a voltage is applied between the mirror and the electrode, the electrostatic force attracts the mirror towards the electrode forming a cylindrically shaped mirror. The MEM device 10 would normally have about 1000 active elements spaced about 1 micron apart as shown in FIG. 4. The upper limit on the number of active elements per linear array depends on several factors including the width of each element and the capabilities of the foundry making the devices. Arrays with several thousand active elements can be made by putting smaller arrays together on a common substrate.

Figure 2A:
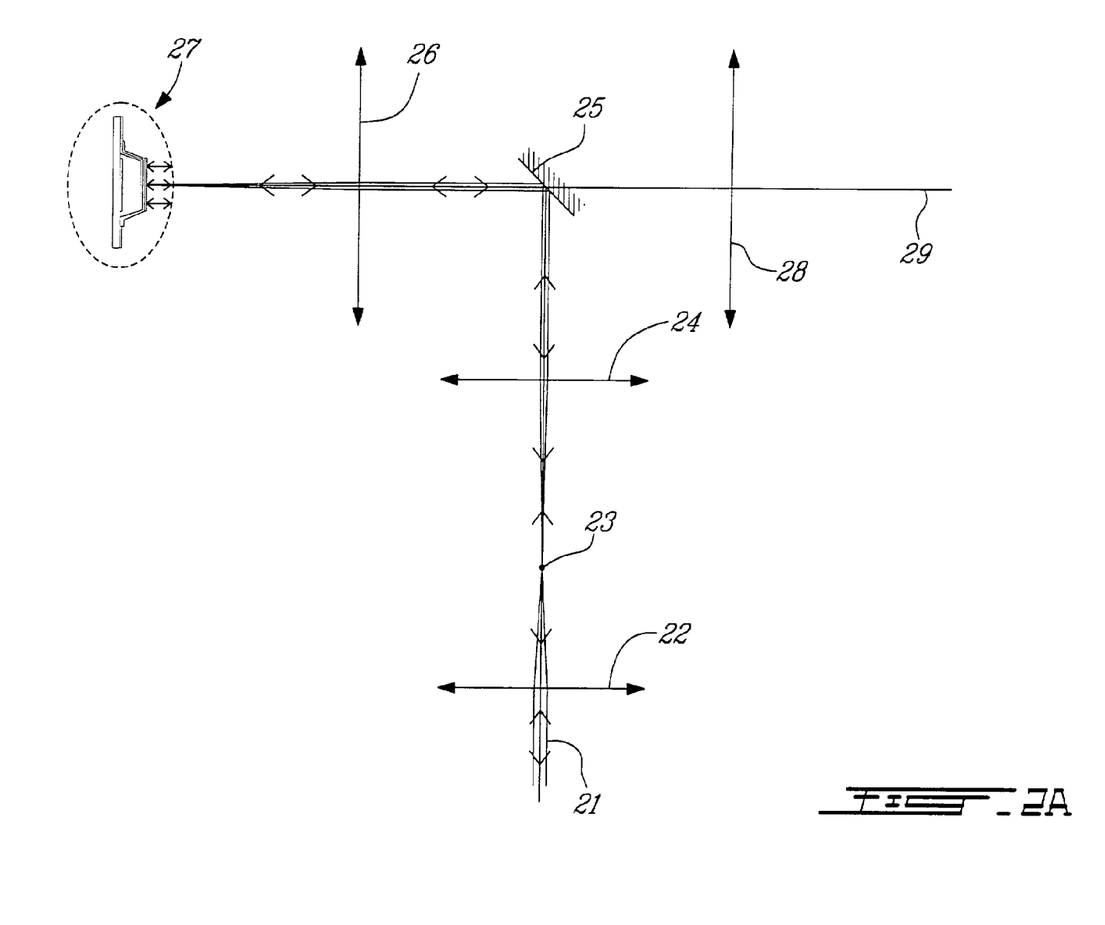
FIG. 2A is a schematic diagram of the optical system as in accordance with the present invention with the active element in its "off" state.

FIG. 2A shows a schematic of a Schlieren optical system coupled to a single active element of a linear array the remainder of which is orthogonal to the plane of the paper and is not shown. A beam of light 21 from the illumination system is focused by an optical system 22 to create a line (ribbon of light having a length equal to the length of the linear array and a width preferably equal to the length of a single element) of light in the image plane 23 orthogonal to the plane of the paper. This light is then collimated by lens 24, deflected by the mirror 25 and focused on the active element 27 by the lens 26. The active element is shown in the state in which it is a flat mirror so the light is reflected back through the lens 26 to the mirror 25, which reflects it back into the illumination system. Other optical elements can be included to ensure that the beam does not go back to the laser itself which may otherwise damage the laser. No light reaches the lens 28 or the image plane 29. FIG. 2A therefore represents the "off" position for the active element.

Figure 2B:
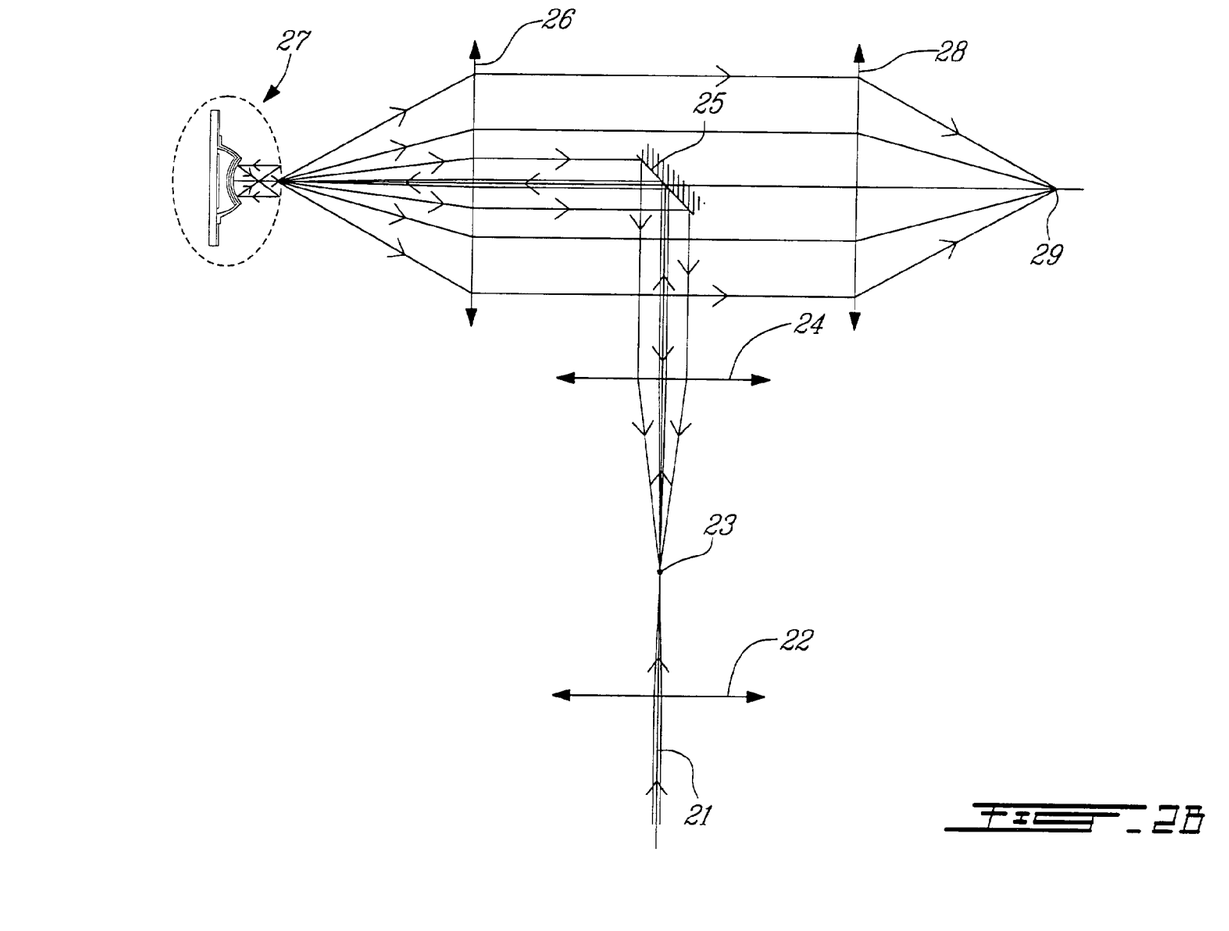
FIG. 2B is a schematic diagram of the optical system as in accordance with the present invention with the active element in its "on" state.

In FIG. 2B, the active element of an array 27 is shown in a deflected position which causes the numerical aperture (N.A.) of the light beam reflected back toward the lens 26 to be increased. This light is then collimated by lens 26 and the part of the light which is not blocked by the mirror 25 is re-focused by lens 28 to the image plane 29. FIG. 2B represents the full on position for the active element. A smaller deflection of the active element causes a smaller increase in the NA of the light reflected back to the lens 26 which results in a proportionally smaller amount of light passing the mirror 25 and a less bright image at 29. Thus, the degree of deflection determines the pixel intensity. The optical elements denoted by 22, 24, 25, 26, 27, and 28, in essence, form a light valve. In the preferred configuration the light 21 is a circular beam of light. The light source itself is preferably a laser source that is linearly polarized, and may include a beam expander and other optical elements.

Each of lenses 24, 26, and 28 represents identical or similar lenses or lens groups with radial symmetry as spherical lenses. Each can be composed of spherical, aspherical or both types of lenses. The lens 22 is an anamorphic objective to create the line of light. It can be composed of spherical, cylindrical and/or anamorphic type of lenses. The width of the mirror is at least sufficient to block all light reflected from the linear array when the active element is in the "off" position. The image at plane 29 is then an image of the linear array having the same width and length, assuming a 1:1 optical relay, the brightness of each pixel being governed by the deflection of the corresponding active element.

Figure 2C:
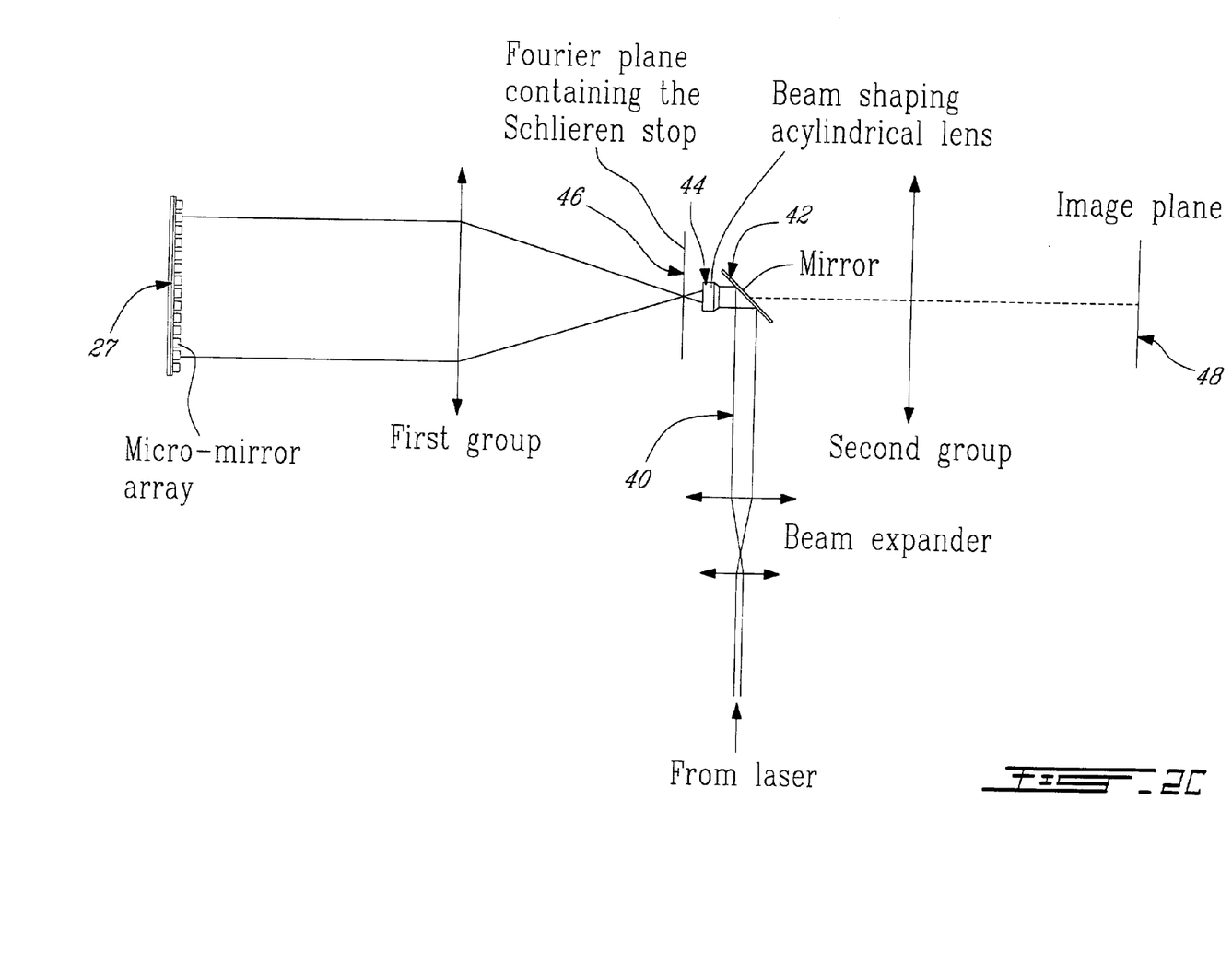
FIG. 2C is a schematic diagram of the optical system as in accordance with an alternative Schlieren optical system.

FIG. 2C shows a schematic of an alternative Schlieren optical system with the illumination system. A beam of light from the laser is adjusted in size and the divergence by an optical telescope 40. After reflection off a small mirror 42, the circular laser beam passes by a non-cylindrical beam shaping lens 44 in order to have a flat intensity distribution on the micro-mirror array after collimation by the first group as shown in FIG. 2C. Orthogonal to the plane of the paper, the laser beam is not affected by the acylindrical lens 44 and the light is focused on the micro-mirror array 27 by the first group. As with the previous system according to the preferred embodiment, if a given micro-mirror is flat the light is reflected back into the illumination system and essentially no light reaches the corresponding point in the image plane. If, however, a given micro-mirror is deflected, the rays of light in a plane orthogonal to the plane of the paper will have an increased angle and will bypass the Schlieren stop 46. The amount of light reaching the corresponding point in the image plane 48 will be proportional to the deflection of the micro-mirror. The Schlieren stop is rectangular in shape and only a few millimeters wide perpendicular to the plane of the paper.

In these embodiments, the Schlieren stop is not symmetric in shape. In the direction of the length of the array, the dimension is large enough to block all the light coming in this direction. Then, all the stray light produced by the array in this direction is blocked by the stop. Perpendicular to the length of the array, the stop is large enough to block and redirect only the light coming back from the micro-mirror when the micro-mirror is in the off position. Then, no light will hit the image plane. It is also within the scope of the present invention to manage the stop dimensions to reduce the stray light produced by the micro-mirror array. In this case, the stop dimensions have to be sized in accordance with the diffraction light pattern in the stop plane.

The foregoing describes two preferred arrangement for the Schlieren system; other such systems well known in the art can also be used.

FIG. 3 is a schematic of the optical scanning and projection system. The Schlieren system produces an image of the linear array at 101. It has a very small NA along the length of the array which is orthogonal to the paper, but the NA at right angles to the array i.e. in plane of the paper, is about 0.3. A collimator consisting of the lens groups 103, 104, 105 and 106, creates a pupil at the scanning mirror 107. Orthogonal to the paper, the pupil will be very small allowing a very narrow and therefore low inertia scanning mirror 107 to be used, such as a galvanometer scanner. Light from the scanning mirror 107 is re-imaged at 111 by the polarizing cube beamsplitter 108, the quarter waveplate 110 and the Mangin mirror 109. Light from the illumination system is heavily polarized which allows this configuration to be very efficient. Other scanning systems can also be used including rotating polygonal mirror systems.

The image 111 is now a 2 D image with one dimension proportional to the length of the linear array and the other dimension proportional to the scanning angle of mirror 107. Optical groups 112, 113, and 114 represent a typical projection lens for projecting the image onto a large screen 120.

The manufacturing process for the MEM-type special light modulator (SLM) is schematically shown in FIGS. 5A–5H. A single microbridge structure (pixel) is shown. However, during the described manufacturing process, all of the SLM pixels are produced at the same time.

Figure 5:
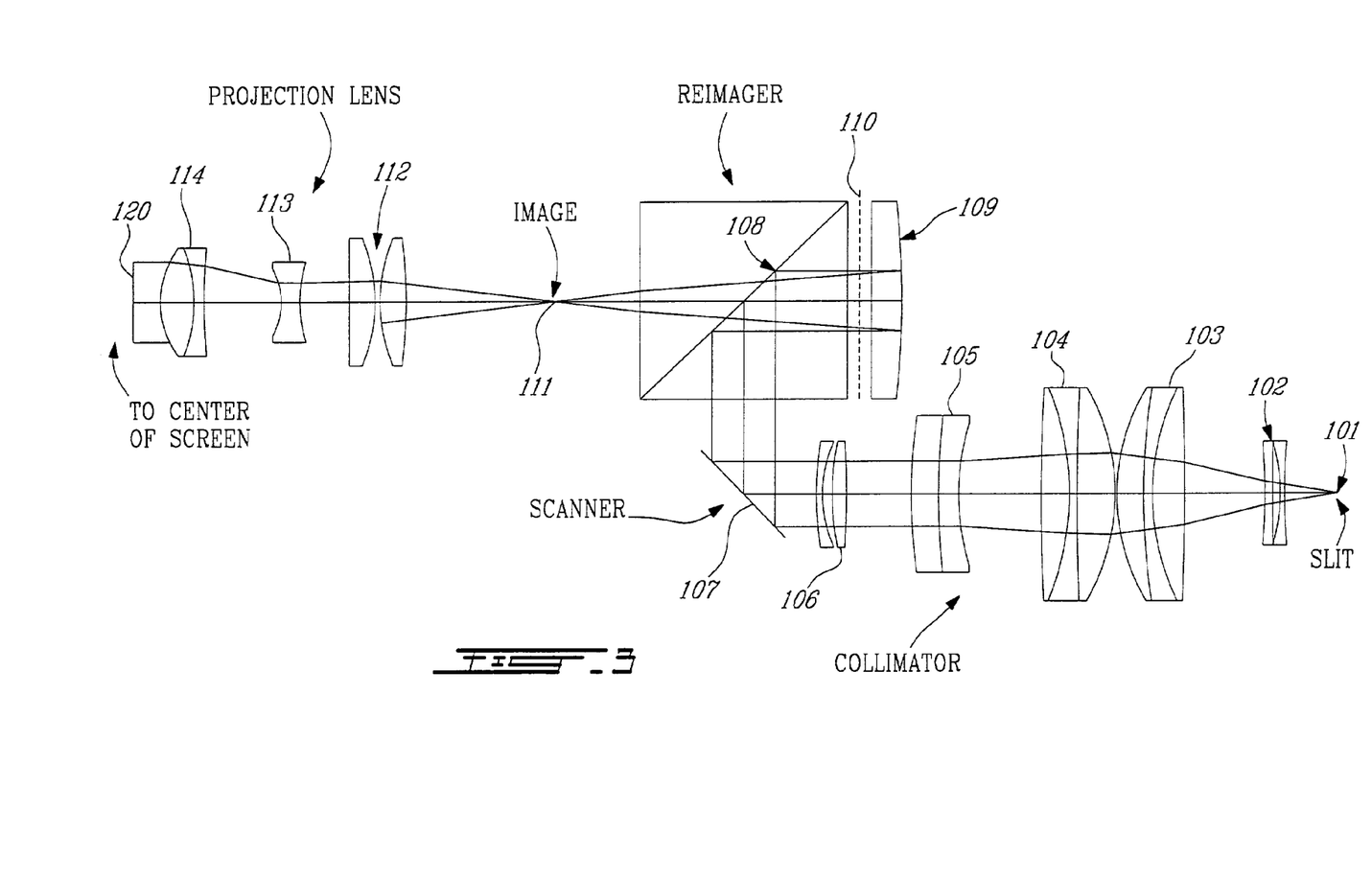
FIGS. 5A–5H illustrate successive steps in the fabrication of a MEM-type spatial light modulator as in accordance with the present invention.
Figure 5A:
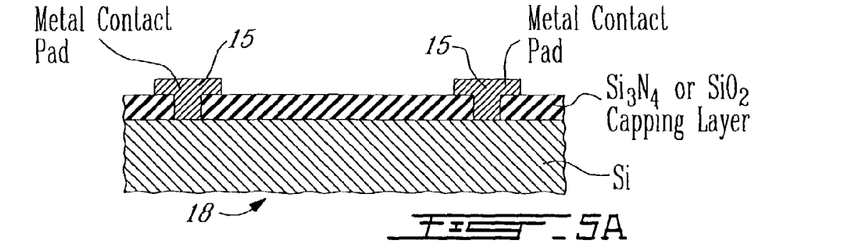

FIG. 5A shows a substrate 18 on which the SLM will be produced. This can be a glass or semiconductor Si wafer equipped with the SLM power and control circuit produced by a standard integrated circuit (IC) manufacturing process. The IC circuit is protected by a dielectric layer 13 typically made of $SiO_2$ or $Si_3N_4$. The substrate is also typically equipped with surface metal contact pads 15 that can provide an electrical connection to the power and control IC.

Figure 5B:
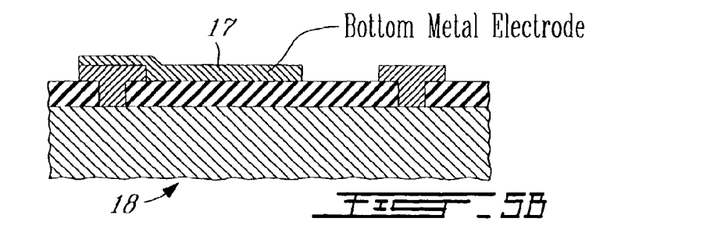

In the manufacturing step shown in FIG. 5B, a bottom metal electrode 17 of the SLM pixel is produced by methods of vacuum thermal evaporation or sputtering combined with the photolithographic pattern definition and plasma or wet etching techniques. This metal electrode may be produced of Al, Au, or other metals and has a thickness of an order of 0.1 μm. This bottom electrode is in contact with the substrate metal contact pad. This provides an electrical contact between the bottom electrode and the power and control IC in the semiconductor substrate.

Figure 5C:
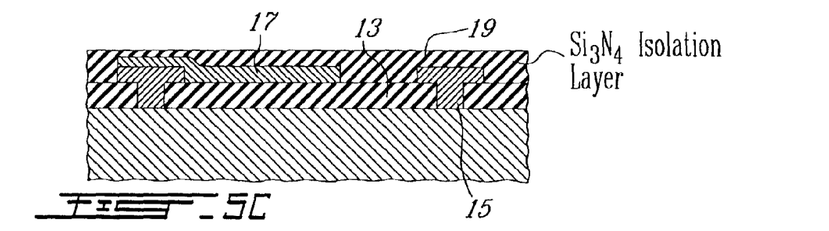

In the manufacturing step shown in FIG. 5C (optional), the substrate with the bottom electrode 17 is covered with a dielectric layer 19 made of typically $SiO_2$ or $Si_3N_4$. This layer produced typically by a plasma enhanced chemical vapor deposition (PECVD) technique has a thickness of a fraction of 1 μm. This dielectric layer will isolate electrically the device upper and lower electrodes.

Figure 5D:
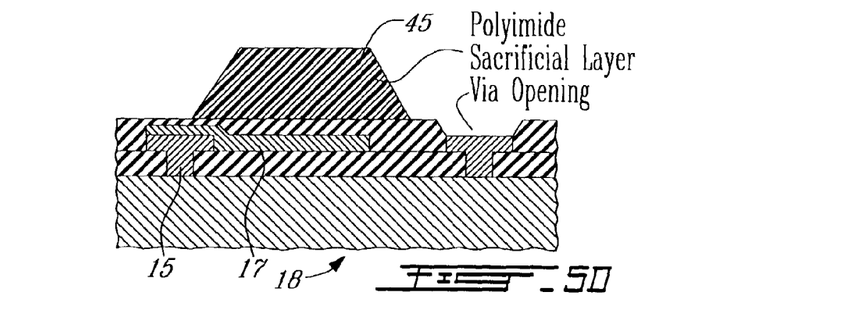

In the manufacturing step shown in FIG. 5D, a sacrificial polyimide layer 45 is deposited by a spin coating technique, baked and then reticulated using a reactive ion etching (RIE) technique combined with the photolithographic pattern definition technique. Thickness of this layer (typically 2–5 μm) will define a distance between the upper and lower device electrodes and the height of the pixel microbridge structure. A via in the isolation layer covering the bottom device electrode is opened down to the substrate metal contact using the RIE technique combined with the photolithographic pattern definition technique.

Figure 5E:
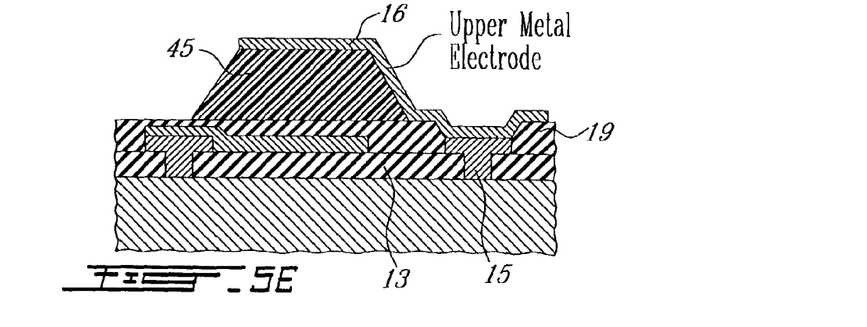

In the manufacturing step shown in FIG. 5E, the device upper metal electrode 16 is produced by methods of vacuum thermal evaporation or sputtering combined with the photolithographic pattern definition and plasma or wet etching techniques. This upper electrode can be made of Al, Au, or other metals and has a thickness of the order of 0.1 μm. The upper electrode is electrically connected to one of the substrate metal contact pads. This provides an electrical connection between the device electrode and the power and control IC in the semiconductor substrate.

Figure 5F:
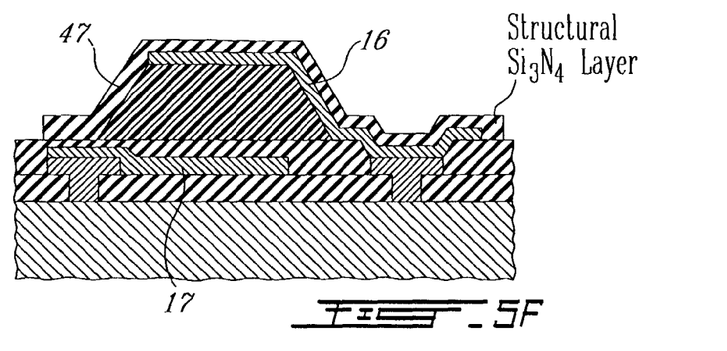

In the manufacturing step shown in FIG. 5F, a structural dielectric layer 47 of the microbridge is deposited and reticulated. This layer is made of $SiO_2$ or $Si_3N_4$ and has typically a thickness of 0.1–0.5 μm. This layer is deposited by the PECVD technique and reticulated using the photolithographic pattern definition and RIE techniques.

Figure 5G:
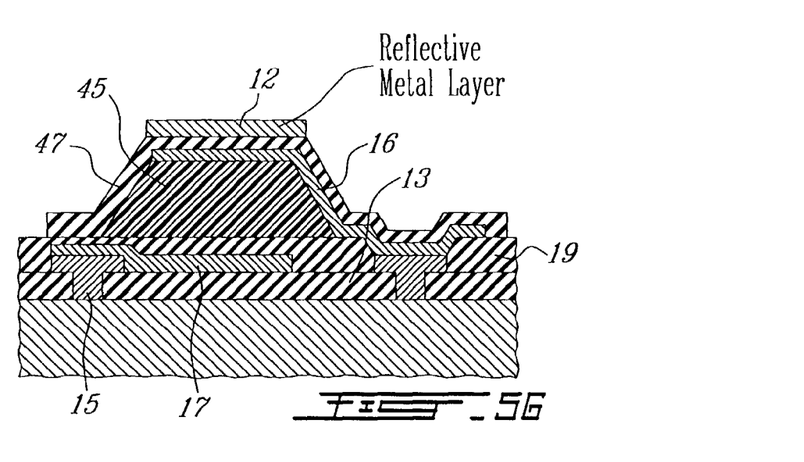

In the manufacturing step shown in FIG. 5G, a reflective metal layer 12 is deposited and reticulated on top of the microbridge structure. This layer can be made of Al, Au, or other highly reflective metals. It has typically a thickness of 0.1–0.5μm. This reflective metal layer is deposited by the vacuum thermal evaporation or sputtering techniques and reticulated by the photolithographic pattern definition technique combined with the plasma or wet etching techniques.

Figure 5H:
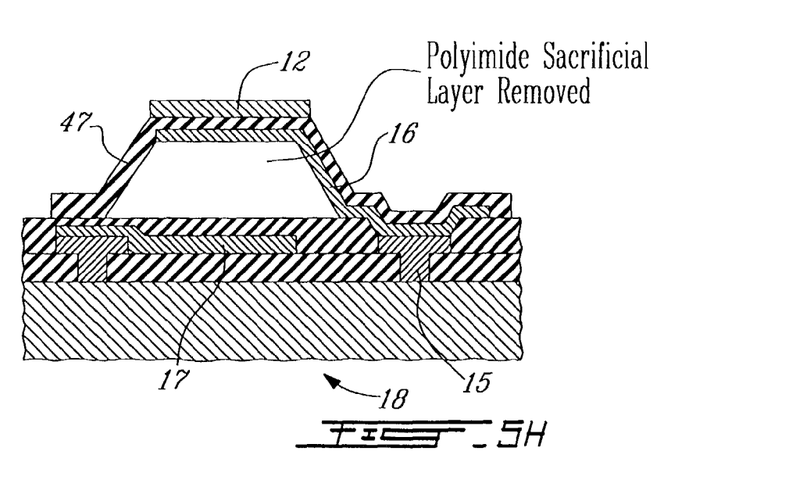

In the last manufacturing step shown in FIG. 5H, the polyimide sacrificial layer 45 is removed by an $O_2$ plasma ashing technique thus leaving the liberated suspended microbridge structure of the SLM pixel.

A tensile induced stress can be induced in the structural dielectric layer 47 of the microbridge mirror shown in FIG. 5 by varying conditions of the layer deposition process. This internal stress will influence both the microbridge mirror switching time between its "on" and "off" positions as well as the voltage which has to be applied to this microbridge mirror in order to induce its deflection towards the substrate 18. In particular, the larger the tensile internal stress in layer 47, the shorter the switching time but the larger the activation voltage. By precisely controlling the induced tensile stress, one can produce the microbridge mirror with a defined switching time and activation voltage.

Having now described a limited number of embodiments of the present invention, it should now be apparent that numerous other embodiments and modifications thereof are contemplated as falling within the scope of the invention as defined by the appended claims.

The invention claimed is:

1. A video electro mechanical device, comprising:
a substrate;
a bridge element formed on the substrate and having a structural member upon which is formed a reflective layer;
said bridge element further comprising end walls supporting said structural member; and
a pair of electrodes mounted on said substrate and said bridge element for causing deflection in said bridge element said deflection including curving of said structural member and bending of at least one of said end walls.

2. A device as set forth in claim 1, wherein said device is comprised of a linear array of bridge elements.

3. A device as set forth in claim 1, wherein said bridge element has at least two different reflectivity states including a first state in which the electrodes are unenergized and the reflective layer is in a first position, and a second state in which the electrodes are energized and the reflective layer is in a deflected position so as to alter the light angle reflected from said reflective layer.

4. A device as set forth in claim 1, wherein said structural member is substantially planar and is maintained in a substantially planar position when said bridge element is in its first unenergized state.

5. A device as set forth in claim 4, wherein said structural member in a deflected position is curved concavely for spreading reflected light.

6. A device as set forth in claim 4, wherein tensile internal stress is induced in the structural member in order to control the switching time between said planar position and said deflected positions as well as the voltage energizing the bridge element.

7. A device as set forth in claim 6, wherein said structural member has the reflective layer on the top surface thereof, and one electrode of said pair of electrodes is supported at a bottom surface of said structural member, and the other electrode is supported under said structural member.

8. A device as set forth in claim 7, wherein there is defined a void somewhere between said one and another electrodes so as to enable deflection of said structural member.

9. A device as set forth in claim 8, wherein said wall means comprises a pair of walls extending from a base and respectively supporting ends of said structural member.

10. A device as set forth in claim 9, wherein said walls support said structural member so that, in the deflected position thereof, the ends of the structural member are maintained substantially fixed while the center of the structural member deflects.

11. A video projector apparatus, comprising:
a linear array of individually addressable reflective active elements having a variable deflection, each one of said active elements comprising a video electro mechanical device, comprising:
   a substrate;
   a bridge element formed on the substrate and having a structural member upon which is formed a reflective layer;
   said bridge element further comprising end walls supporting said structural member; and
   a pair of electrodes mounted on said substrate and said bridge element for causing deflection in said bridge element said deflection including curving of said structural member and bending of at least one of said end walls;
an optical system including a light source and providing a linear light pattern focused on said linear array and from which is created an image of the linear array with pixel intensities being a function of said deflection;
an optical scanning system for receiving the image of the linear array including a scanning member that successively scans said array to provide a two-dimensional image; and
a projection system receiving said two-dimensional image and including a screen upon which the o-dimensional image is displayed.

12. A video projector as set forth in claim 11, wherein said optical system is configured so that when there is no deflection, the light pattern representative thereof is substantially completely off.

13. A video projector as set forth in claim 11, wherein said optical system comprises Schileren optical apparatus.

14. A video projector as set forth in claim 11, wherein said two-dimensional image has one dimension proportional to the length of the linear array and the other dimension proportional to a scanning range of said scanning member.

15. A video projector as set forth in claim 11, wherein said optical system further comprises a mirror for focusing said linear light pattern on said linear array.

16. A video projector as set forth in claim 15, wherein each said active element has "on" and "off" states.

17. A video projector as set forth in claim 16, wherein for the "off" state of the active element substantially all light reflected from said active element is directed toward said optical system and reflected from said mirror.

18. A video projector as set forth in claim 17, wherein for the "on" state of the active element part of the light reflected from said active element by-passes said mirror to define a brightness pixel of said image.

* * * * *